United States Patent

[11] 3,623,776

| [72] | Inventor | Ellis M. Wellman<br>Erie, Pa. |
|---|---|---|
| [21] | Appl. No. | 93,155 |
| [22] | Filed | Nov. 27, 1970 |
| [45] | Patented | Nov. 30, 1971 |
| [73] | Assignee | The Weatherhead Company<br>Continuation of application Ser. No.<br>813,820, Apr. 7, 1969, now abandoned.<br>This application Nov. 27, 1970, Ser. No.<br>93,155 |

[54] BRAKE PRESSURE PROPORTIONING VALVE
7 Claims, 3 Drawing Figs.

[52] U.S. Cl. .................................................. 303/6 C,
137/493.2, 137/505.25, 188/349
[51] Int. Cl. ....................................................... B60t 11/34,
B60t 8/26
[50] Field of Search .......................................... 303/6 C;
188/345, 349; 60/54.5 E; 137/493.2, 493.7, 525,
505.25

[56] References Cited
UNITED STATES PATENTS

| 3,087,761 | 4/1963 | Stelzer | 303/6 (C) X |
| 3,245,221 | 4/1966 | James et al. | 303/6 (C) X |
| 3,298,394 | 1/1967 | Chorkey | 137/525 |
| 3,437,109 | 4/1969 | Carlson et al. | 137/505.25 |
| 3,441,318 | 4/1969 | Bueler | 303/6 (C) |
| 3,472,559 | 10/1969 | Bueler | 303/6 (C) |
| 1,534,899 | 4/1925 | Boggiano | 137/505.25 X |
| 2,408,513 | 10/1946 | Gunderson | 303/6 UX |
| 2,966,916 | 1/1961 | Cummins | 137/505.25 X |
| 3,290,882 | 12/1966 | Obertur | 303/6 C X |
| 3,360,004 | 12/1967 | Lewis et al. | 303/6 C X |
| 3,426,790 | 2/1969 | Dey | 137/505.25 X |
| 3,462,200 | 8/1969 | Lewis et al. | 303/6 C |
| 3,508,793 | 4/1970 | Bueler | 303/6 C |

*Primary Examiner* — Milton Buchler
*Assistant Examiner* — John J. McLaughlin
*Attorney* — McNenny, Farrington, Pearne & Gordon ABSTRACT: A brake pressure proportioning valve includes an internal bore and a differential area piston slidably mounted within the bore. Under low-pressure conditions, fluid communication is established between the inlet and outlet pressures. When the inlet and outlet pressure increase, the piston moves against the biasing force of a spring to a displaced position to tend to cause the end of the internal bore to seat against a plug to isolate the inlet pressure from the outlet pressure. Any further increase in the inlet pressure increases the outlet pressure only a fractional amount of the inlet pressure increase due to the differential area piston. A ring-type check valve prevents the piston from being hydraulically locked in its displaced position.

PATENTED NOV 30 1971

3,623,776

INVENTOR
ELLIS M. WELLMAN
BY
McNENNY, FARRINGTON, PEARNE & GORDON
ATTORNEYS

BRAKE PRESSURE PROPORTIONING VALVE

BACKGROUND OF THE INVENTION

This is a continuation application of my application, Ser. No. 813,820, filed Apr. 7, 1969, and now abandoned.

This invention relates generally to pressure-regulating valves, and more specifically to pressure-proportioning valves that are operable to maintain the outlet pressure a differential below the inlet pressure after a predetermined inlet pressure is reached or exceeded. Still more specifically, this invention relates to such pressure-proportioning valves that are particularly adapted for use in motor vehicle braking systems to prevent premature lockup of the front or rear brakes.

Motor vehicles have long used a hydraulic brake system in which a foot pedal is used to operate a master cylinder which serves as a pump to force hydraulic fluid throughout either the entire system or, more recently, the front wheel system and the rear wheel system independently. This actuates the slave cylinders at the individual wheels of the vehicle for actuation of the brakes, which may be commonly either the drum type or the caliper disc type.

In such automobile hydraulic brake systems, it is usually desirable to provide a lower fluid pressure to the rear wheel brakes than to the front wheel brakes under severe braking conditions. This prevents premature lockup of the rear wheel brakes of the automobile, which might otherwise be caused by a weight decrease on the rear wheels resulting from a transfer weight from the rear wheels to the front wheels upon rapid deceleration. Such premature lockup of the rear wheels of an automobile may also tend to result under severe braking conditions when caliper disc type brakes are used on the front wheels of the vehicle and drum type brakes are used on the rear wheels, due to the self-energizing action of the drum type brakes.

Although many types of pressure-regulating valves have been proposed and used for controlling and regulating the fluid pressure supplied to either the front or the rear brakes of a motor vehicle, such valves have generally been quite complex. There have been proposed inertia valves which rely upon movement of a member within a housing, resulting from its inertia in the event of rapid deceleration, to isolate the inlet pressure from the outlet pressure to limit any further increase in outlet pressure as a result of an increase in the inlet pressure. Also proposed have been piston valves which generally include two differential area pistons and an associated valving arrangement operable under predetermined pressure conditions to regulate the outlet pressure with respect to the inlet pressure.

SUMMARY OF THE INVENTION

The invention provides a simple and inexpensive pressure proportioning valve which may be used in any desired hydraulic circuit, but which is particularly adapted for use in a motor vehicle dual braking system to regulate the fluid pressure supplied to either the front or the rear brakes.

The preferred embodiment of this invention provides such a pressure-proportioning valve which may be interposed in a hydraulic brake system between the master cylinder and the slave cylinders of the rear wheels. When the hydraulic pressures in the system are relatively low, such as would occur under very moderate braking conditions or during advancement of the brake shoes or pads toward their braking surfaces, the valve permits equalization of the outlet pressure supplied to the slave cylinders and the inlet pressure supplied from the master cylinder. However, when the system pressure increases above a predetermined pressure level, such as would occur under more severe braking conditions, the invention provides a single differential area piston that functions to isolate the inlet pressure from the outlet pressure, and to maintain a proportional relationship between any further increase in the outlet pressure and any further increase in the inlet pressure supplied from the master cylinder.

According to other features and advantages of the invention, a differential area piston is provided which is slidably disposed within a bore and which is arranged so that its smaller diameter portion is exposed to the inlet pressure and its larger diameter portion is exposed to the outlet pressure. A passage in the valve establishes fluid communication between the inlet pressure and the outlet pressure so that the inlet and outlet pressures are equal when the system pressure is relatively low. When the inlet and outlet pressure increase to a predetermined pressure level, the greater axial force on the larger diameter portion moves the piston against the biasing force of a spring to a displaced position. With the piston in this displaced position, a valve head formed on the smaller diameter portion of the piston cooperates with a valve seat to close the passage means and isolate the inlet pressure from the outlet pressure. Then, any further increase in the inlet pressure from the master cylinder acts on the smaller diameter portion of the piston to increase the outlet pressure only a fractional amount of the inlet pressure increase due to the difference between the piston area on the inlet side and the piston area on the outlet side. Should any makeup fluid be required, the valve head will move away from its seat to permit the required makeup fluid to flow through the passage means. When the inlet pressure thereafter decreases, such as upon release of the brakes, the valve head is maintained against its associated seat by the fluid force on the larger diameter portion until the inlet pressure equals the outlet pressure. At this point, a check valve opens to establish fluid communication between the outlet pressure and the inlet pressure to equalize the pressures applied to the two sides of the piston.

In a specific embodiment, both the smaller diameter portion and the larger diameter portion of the piston make sealing engagement with the bore to prevent fluid leakage. The differential area at the junction of the larger diameter portion and the smaller diameter portion is vented to ambient pressure conditions to insure proper operation of the invention even if one of the seals fails. The passageway which establishes communication between the inlet and outlet pressures is formed through the piston itself, and the valve head is formed by the annular end face of the smaller diameter portion of the piston. The valve seat is formed by the radial end face of a resilient plug member which is pressed into the inlet side of the bore. The one-way check valve is formed by a resilient annular ring which covers a radial passage extending from the passage to the inlet side of the bore so that a greater outlet pressure in the passage will push the resilient seal radially outwardly and establish fluid communication between the outlet and the inlet pressures.

DESCRIPTION OF THE PREFERRED EMBODIMENT

Figure 1:
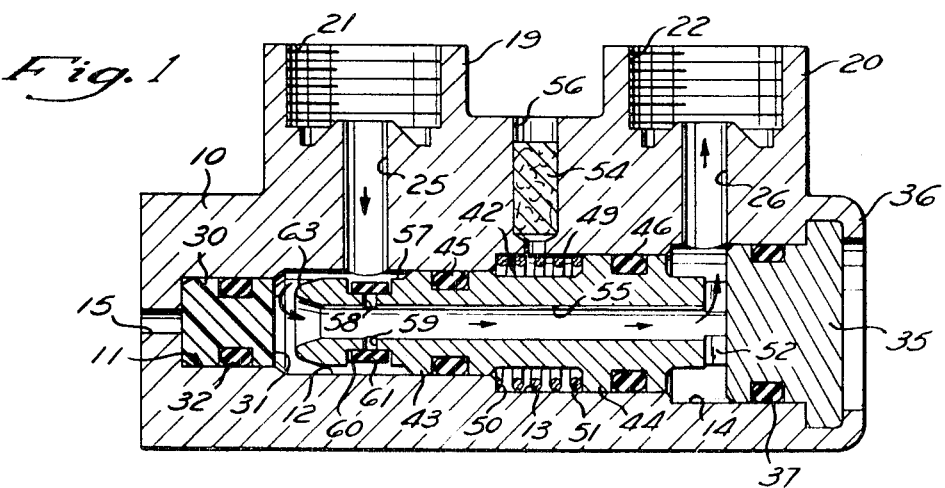
FIG. 1 is a cross sectional, side elevational view of a valve according to the preferred embodiment of this invention.
Figure 2:
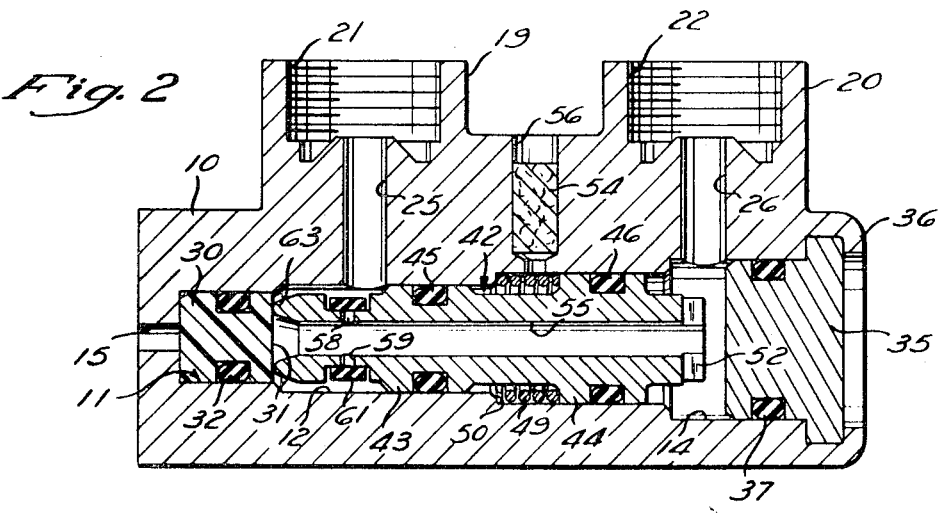
FIG. 2 is a cross-sectional, side elevational view of the valve shown in FIG. 1, but with the piston shown in a displaced position.

Referring now to the drawings in greater detail, FIGS. 1 and 2 show a proportioning valve which is particularly adapted for use in a motor vehicle dual braking system. When the valve is used for such purposes in an automobile, it is interposed between the braking system master cylinder and the hydraulic line leading to the slave cylinders on the rear wheels to regulate the fluid pressure supplied to the rear brakes.

The brake pressure proportioning valve according to the preferred embodiment of the invention includes a housing 10 having a bore 11 extending axially therein. The bore 11 opens to the right to a first counterbore 12, a second counterbore 13, and a third counterbore 14 which extends to the right end of the housing 10. A small vent passage 15 extends from the bore 11 to the left end of the housing 10. The housing 10 is provided with enlarged bosses 19 and 20 at its left and right ends, respectively, within which are formed the threaded inlet and outlet ports 21 and 22. The ports 21 and 22 are each adapted to receive inverted flare-type fittings, which are commonly used in hydraulic braking systems. Two transverse bores 25 and 26 establish fluid communication between the ports 21 and 22, respectively, and the left and right ends of the bore 11 at the counterbores 12 and 14 respectively.

A resilient plug member 30 is pressed into the bore 11 so that its radial end face 31 can be utilized as a valve seat in a manner that will be described in detail hereinafter. The plug member 30 is provided with an annular elastomeric seal 32 to prevent fluid leakage from the left end of the bore 11, and the vent passage 15 permits escape of the air that is displaced from the bore 11 when the plug member 30 is pressed in place. Another means for accomplishing this if the bore 11 is a blind bore is to provide a vent passage extending axially through the resilient plug member 30 itself. The member 30 is preferably formed of a hard and wear resistant resilient material such as nylon and the seal 32 as well as all other seals may be O-ring seals made from a suitable elastomeric material which provides good sealing characteristics over a wide range of temperatures and high resistance to deterioration from the brake fluid. The other end of the bore 11 is sealed by a plug member 35 which is secured by spinning or deforming the annular tab or flange 36 radially inwardly to the position shown in FIG. 1. The annular elastomeric seal 37 prevents the escape of fluid from the right end of the bore 11.

Slidably disposed within the bore 11 is a piston 42 having a smaller diameter portion 43 adjacent the inlet side of the valve exposed to inlet pressure and a larger diameter portion 44 adjacent the outlet side of the valve exposed to outlet pressure. The portions 43 and 44 make sealing contact with the counterbores 12 and 13 respectively by the annular seals 45 and 46. A coil spring 49 acts between the shoulder 50 formed at the junction of the counterbores 12 and 13, and the shoulder 51 formed at the junction of the smaller diameter portion 43 and the larger diameter portion 44 to bias the piston means 42 to the right as shown in FIG. 1 so that the projecting stop 52 engages the plug member 35 to maintain the piston in a spring biased position. A passage 55 extends axially through the piston means 42 to establish fluid communication between the inlet port 21 and the outlet port 22 when the piston is in the position shown in FIG. 1.

A vent passage 56 extends radially outwardly from the counterbore 13 to the external surface of the housing 10 to ensure that the differential piston area between the portions 43 and 44 is always exposed to atmospheric pressure. This prevents hydraulic lockup of the piston 42 in its spring biased position, such as might otherwise occur in the absence of such a passage should there be leakage past either of the seals 45 or 46. The vent 56 contains a filter 54 which may be oiled felt or porous metal, to permit the ambient pressure to be maintained on the differential area of the piston while preventing contaminates from entering the unit. An alternative means for accomplishing this is the use of a permeable membrane or diaphragm located in the vent passage 56.

At the inlet side of the proportioning valve, the piston 42 is provided with a reduced diameter end portion 57. The end portion 57 is provided with several passages 58 and 59 which extend radially outwardly from the axial passage 55 to the external surface of the piston 42. As shown in the preferred embodiment, the passages 58 and 59 terminate at an annular groove 60 which receives the annular elastomeric band or belt 61 to form a one-way ring-type check valve for purposes that will be discussed in greater detail hereinafter. The left end of the piston 42 forms an annular rounded valve head 63 which cooperates with the valve seat 31 to isolate the inlet port 21 from the outlet port 22 when the piston is moved to the displaced position shown in FIG. 2.

Under low pressure conditions, such as occur in the braking system under very moderate braking conditions or while the braking shoes and/or pads are advancing toward their braking surfaces, the resulting force acting on the piston 42 due to the difference in effective cross-sectional areas of the portions 43 and 44 is not sufficient to overcome the biasing force of the spring 49 so that the piston assumes the position as shown in FIG. 1. In this position, the proportioning valve does not decrease the fluid pressure, so that the outlet pressure supplied to the rear brakes of the automobile from the port 22 is substantially equal to the inlet pressure supplied to the port 21 from the braking system master cylinder. The fluid flow through the valve will then be as shown by the arrows in FIG. 1. The operation of the proportioning valve under these conditions, i.e., when the inlet pressure equals the outlet pressure, is illustrated graphically by the line OA in FIG. 3. In this graphical representation, the horizontal axis represents the fluid pressure supplied to the inlet port 21 by the braking system master cylinder, and the vertical axis represents the outlet pressure in the port 22 supplied to the slave cylinders in the rear wheel brakes.

Figure 3:
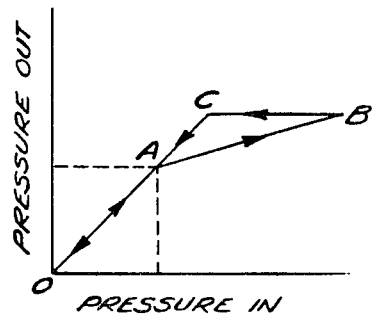
FIG. 3 is a graphical representation of the relationship between the inlet and outlet pressures of the valve shown in FIGS. 1 and 2.

Under more severe braking conditions, the fluid pressures in the system will be increased above the pressure indicated by point A in FIG. 3. When this occurs, the resulting axial force on the piston 42, due to the difference in effective cross-sectional areas of the portions 43 and 44, will move the piston against the biasing force of the spring 49 to the displaced position shown in FIG. 2. In the preferred embodiment the spring 49 has a relatively high preload and a relatively low spring rate so that this movement will occur with little pressure increase when the pressure indicated by point A is reached. Since the brake shoes and/or pads have already contacted their braking surfaces when this occurs, there will be very little or no flow through the valve as the pressures continue to increase.

With the piston 42 in its displaced position shown in FIG. 2, the valve head 63 engages the valve seat 31 to isolate the inlet pressure acting on the smaller diameter portion 43 from the outlet pressure acting on the larger diameter portion 44. Then, as the inlet pressure from the braking system master cylinder increases beyond the pressure indicated by point A, the difference in effective cross-sectional areas between the portions 43 and 44 will result in a pressure increase in the outlet side of the valve that is less than but proportional to the pressure increase on the inlet side. This phase of the operation of the valve is shown by line AB in FIG. 3. The proportional relationship between the increase in inlet pressure and increase in outlet pressure beyond point A is the slope of the line AB and is equal to the proportional relationship between the areas of the smaller diameter portion 43 and the larger diameter portions 44. Should any makeup fluid be required downstream of the proportioning valve, for example due to radial expansion of the hydraulic lines, deformation of the seals, deformation of the shoes and drums, or leakage, the piston 42 will move to the right to permit this makeup fluid to flow between the valve head 63 and the valve seat 31. If this occurs, the pressure drop takes place across the members 31 and 63 so that the space between them serves as a valve throttling area.

When the fluid pressure from the braking system master cylinder decreases from a point such as B which is greater than the pressure at A, the outlet pressure will remain constant until the inlet pressure equals the outlet pressure. This is because the outlet pressure retains the piston 42 in its displaced position so that isolation between the outlet and inlet ports is maintained. This phase of the operation of the proportioning valve is shown by line BC in FIG. 3. When the inlet pressure has decreased so that it equals the outlet pressure, as at point C, the ring type check valve formed by the passages 58 and 59 and the annular band 61 opens to permit pressure equalization between the inlet and the outlet pressures. This phase of operation of the valve is shown by line CA. Further decrease in the system pressure below point A then permits the piston 42 to return to the spring biased position shown in FIG. 1.

Although the invention has been described in detail as being utilized in a dual hydraulic brake system for an automobile, the valve is suitable for other applications where pressure modulation is required and may be used in a variety of other hydraulic and pneumatic systems. Such rearrangements and modifications as may become apparent to those skilled in the art upon a full understanding of this invention may be resorted to without departing from the scope of the invention.

I claim:

1. A valve comprising a housing having a bore therein, a fluid inlet communicating with said bore, a fluid outlet communicating with said bore, a piston means slidably mounted in said bore and having an inlet end face and a differential area means for increasing fluid pressure in said fluid outlet in a proportional relation to increases in fluid pressure in said fluid inlet above a predetermined pressure, spring means biasing said piston means to a first predetermined position in said bore, passage means extending from said inlet end face of said piston means axially at least partially through said piston means for establishing fluid communication between said fluid inlet and said fluid outlet, an annular valve member defined by a portion of said piston means surrounding said passage means, a closed valve seat in said bore for engaging said annular valve member to close said passage means and isolate said fluid inlet from said fluid outlet when said predetermined pressure obtains in said fluid inlet and said piston means is moved in said bore against the force of said spring means away from said fluid outlet to a displaced position by fluid pressure acting on said differential area means, said differential area means including a first effective cross-sectional area exposed to the fluid inlet pressure after said valve means is closed by said movement of said piston to said displaced position and a second effective cross-sectional area exposed to fluid outlet pressure after said valve means is closed by said movement of said piston to said displaced position, said first effective area being smaller than said second effective area, said first and second effective areas being arranged such that further increases in fluid pressure in said fluid inlet above a predetermined pressure causes a proportionate but smaller increase in fluid pressure in said fluid outlet when said piston means remains substantially stationary in said displaced position and the fluid flow rate from said fluid inlet to said fluid outlet is substantially zero, and means operable under normal operating conditions for positively preventing movement of said valve seat beyond a predetermined position in a direction toward said outlet and for permitting said piston means to move toward said fluid outlet away from said valve seat to open said passage means whereby the fluid flows through said annular valve member and the fluid pressure drop from said fluid inlet to said fluid outlet occurs across said annular valve member by operation of said differential area means.

2. A valve as set forth in claim 1 wherein said closed valve seat includes a substantially flat radial end wall for engaging said annular valve member.

3. A valve as set forth in claim 1 wherein said differential area means includes a first seal on a smaller diameter portion of said piston means and a second seal on a larger diameter portion of said piston means, said first effective area is equal to the difference between the cross-sectional area of said first seal and the cross-sectional area of said annular member, and said second effective area is equal to the difference between the cross-sectional area of said second seal and said cross-sectional area of said annular member.

4. A valve as set forth in claim 3 including means opening said passage means when the fluid pressure in said fluid inlet decreases from a pressure greater than said predetermined pressure to a pressure less than the fluid pressure in said fluid outlet.

5. A valve as set forth in claim 4 wherein said means opening said passage means includes a radial passage extending through said piston means from said axial passage means to the outer periphery of said piston means and an elastomeric member normally closing said radial passage.

6. A valve as set forth in claim 1 wherein said spring means is located within said housing surrounding said piston means intermediate said first and second effective cross-sectional areas of said piston means.

7. A valve as set forth in claim 1 wherein said valve seat member is a substantially solid resilient plug member in one end of said bore, and a vent means extends through said housing from said one end of said bore to establish communication between atmospheric pressure and said one end of said bore for venting the air displaced by said plug member when said plug member is inserted in said bore and for maintaining a pressure differential across said plug member so that the fluid inlet pressure retains said plug member in said one end of said bore.

* * * * *